Oct. 25, 1932.  C. W. HOWARD  1,884,701
AIRCRAFT
Filed June 4, 1930   2 Sheets-Sheet 1

INVENTOR
CLINTON W HOWARD
BY Robert H. Young
ATTORNEY

Oct. 25, 1932.  C. W. HOWARD  1,884,701
AIRCRAFT
Filed June 4, 1930   2 Sheets-Sheet 2
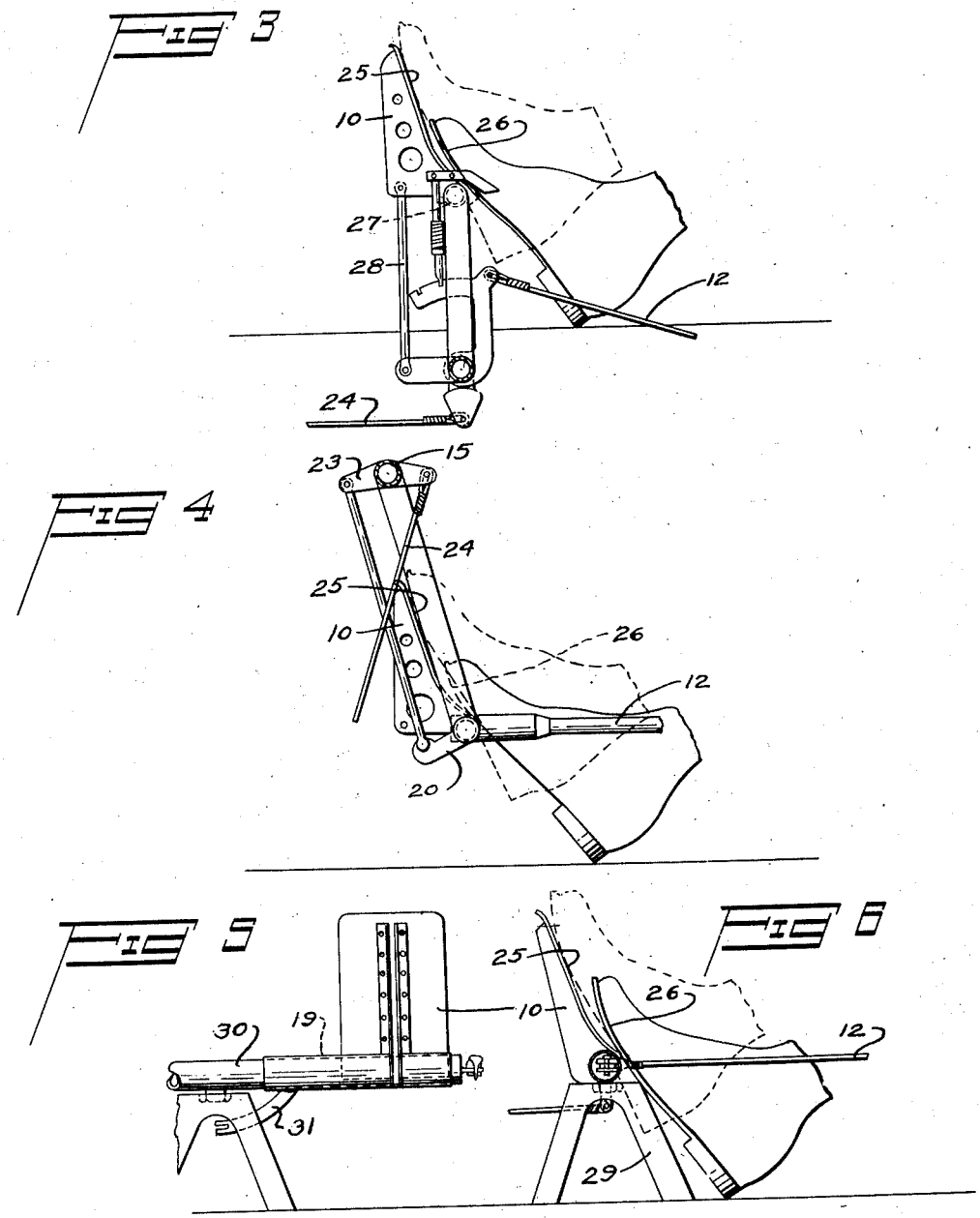
INVENTOR
CLINTON W HOWARD
BY Robert H. Young
ATTORNEY Patented Oct. 25, 1932

1,884,701

UNITED STATES PATENT OFFICE

CLINTON W. HOWARD, OF DAYTON, OHIO

AIRCRAFT

Application filed June 4, 1930. Serial No. 459,231.

(GRANTED UNDER THE ACT OF MARCH 3, 1883, AS AMENDED APRIL 30, 1928; 370 O. G. 757)

The invention described herein may be manufactured and used by or for the Government for governmental purposes, without the payment to me of any royalty thereon.

The present invention relates generally to improvements in aircraft and more particularly to improved means for controlling the forward motion of the aircraft when moving over the ground.

As is well known, directional changes in the forward motion of the aircraft over the ground is now attained by using a unitary brake and rudder control mechanism for the landing wheel brakes and rudder of the aircraft, the brake control mechanism not only assisting the rudder and guiding the aircraft over the ground by selectively operating either landing wheel brake, but also serving the purpose of restraining the forward motion of the aircraft by simultaneous operation of both foot brakes whereby to quickly bring the aircraft to a stop. In this type of brake and rudder control mechanism the brake pedal for operating the brakes is usually pivotally mounted upon the rudder control mechanism; the foot occupies practically the same position for both brake and rudder operation, a bodily fore and aft movement of the foot being required for rudder operation and a pivoting movement about the ankle for brake operation. In operating the rudder control mechanism the heel of the foot normally rests on the floor of the cockpit so that the ball of the foot may be used to apply pressure directly to the brake or rudder control. Consequently the natural angular position thus assumed by the foot when in rudder operating position effects a partial and unintentional operation of the brake control mechanism due mainly to this particular design of pedal arrangement and the method of carrying the same upon the rudder control mechanism.

A primary object, therefore, of the present invention is to provide a novel brake pedal which is carried by the rudder control mechanism whereby independent operation of either the brake or rudder control mechanism may be effected without lifting the foot from the controlling mechanism, the latter being accomplished by a sliding motion of the foot from one control position to the other. The possibilities of the aviator inadvertently operating the brakes when it is his intention to operate the rudder control are therefore practically eliminated by reason of the fact that the foot occupies distinctly different positions for either brake or rudder operation.

A further object of the present invention is to provide a novel brake pedal which is pivotally mounted upon the rudder control mechanism and which is so shaped that when the ball of the foot is used to apply pressure to the rudder control mechanism clearance between the toe and brake pedal is provided so that unintentional operation of the brakes while the foot is in rudder operating position is avoided. According to the present invention the shape of the pedal is such that the foot may change its angular position while operating the rudder control mechanism and yet have no effect on the brake controls. Furthermore, the brake pedal and the rudder control mechanism are constructed in such a manner that the ball of the foot may be used to apply pressure to either the brake control or the rudder control mechanism merely by a sliding motion of the foot from one position to the other.

My invention also consists in certain other features of construction and in the combination and arrangement of the several parts to be hereinafter fully, clearly, and concisely described and defined in the appended claims and illustrated in the accompanying drawings, in which:

Fig. 3 is a modified view showing the application of the brake pedal to a rudder control of the bottom hinged type.

Fig. 4 is a side elevation of Fig. 2.

Fig. 5 is a still further modification showing the application of my improved brake control pedal to a rudder bar of conventional type.

Fig. 6 is a side elevation of Fig. 5.

Referring more particularly to the drawings where corresponding parts are designated by like numerals throughout the various views thereof, the usual rudder control pedals indicated by numeral 10 are shown as pivotally mounted for fore and aft movement in the cockpit of an aircraft convenient to the pilot or aviator whereby movement of the rudder pedal by foot pressure actuates the rudder 11 through the medium of interconnected cables 12.

In accordance with the present invention each of the landing wheels 13 of the undercarriage of the aircraft is provided with a suitable braking mechanism generally indicated at 14, which may be of a contracting or expanding type embodying a band or brake shoe, it being understood that any well known and efficient method or means for retarding the rotation of the wheels now known, or which may be hereafter developed, may be used in applying this invention.

Figure 1:
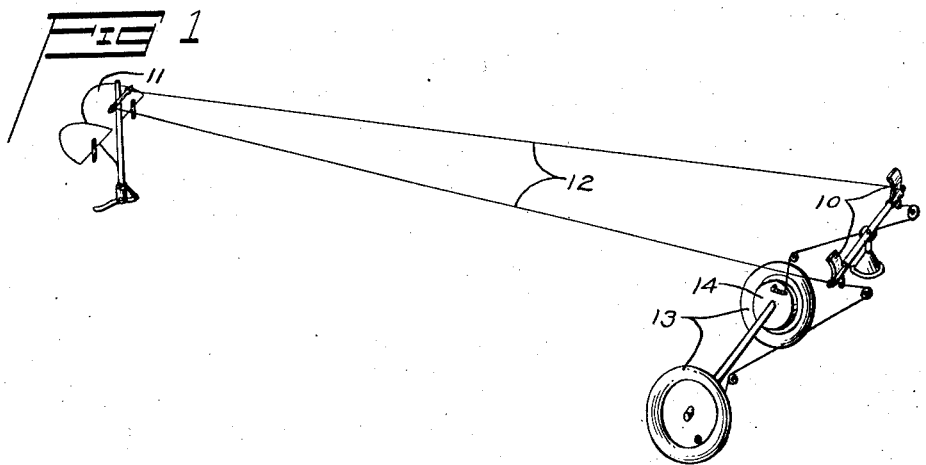
Fig. 1 is a view in perspective showing the manner in which the brake control for operating the wheel brake is carried by the rudder control mechanism.
Figure 2:
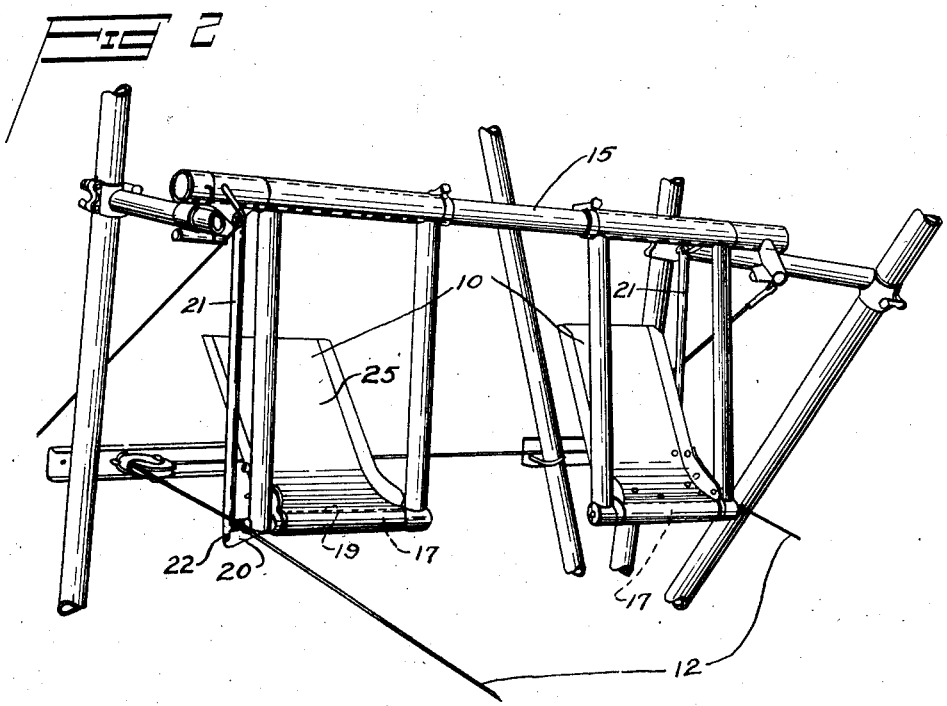
Fig. 2 is a perspective view incorporating a brake pedal in accordance with my invention shown mounted on a rudder control of the stirrup type.

As will be noted by referring to Fig. 2 the rudder control pedals 10, which are of the stirrup type, are shown pivotally mounted to a cross bar 15 carried by the fuselage of the aircraft a substantial distance above the floor line of the cockpit. At their lower ends the control pedals 10 are provided with cross tubes 17, upon which the brake control pedals are pivotally mounted as shown by numeral 19, the aforesaid portions of the brake pedals also serving as a means for applying foot pressure to the rudder pedal in operating the rudder. Each brake pedal is provided adjacent its pivoted end with a brake control arm 20, suitably connected to a cooperating control arm 21 by means of the link member 22 shown in Fig. 2. The upper control arm is conveniently mounted for pivotal movement upon the cross bar 15 heretofore mentioned and carries a lever 23 to which one end of a cable 24 for operating the wheel brakes is connected, the other end of the cable being connected to the wheel brakes in any well known manner.

The treadle face 25 of each brake pedal is offset or concave, as will be noticed by referring to Fig. 2, so that when the heel of the foot rests on the floor of the cockpit in operating the rudder the toe will not touch the treadle of the brake pedal but will rest on the pivoting portion of the brake pedal as shown by numeral 26.

From the foregoing general description of my invention it will be apparent that two distinctly different positions of the foot are required to operate the rudder control and the brake control mechanism, the position of the foot when operating the rudder control being shown in full line, the dotted line indicating the approximate position required to operate the brakes, which same is effected merely by a sliding movement of the foot from one position to the other without removing the foot brake controls.

Fig. 3 is a modified form of the invention wherein the brake control pedal is shown applied to a bottom hinged type rudder control. In this form of the invention the brake pedal hinges to the upper bar 27 of the rudder control and is connected by a simple link arrangement generally indicated by numeral 28 to the brake cable 24 for operating the brakes.

Fig. 5 shows a still further modification in which the brake control pedal is shown applied to the rudder bar type of control. In the arrangement herein shown the rudder bar is pivoted about a central supporting bracket 29 mounted on the floor of the cockpit and a brake pedal is pivotally mounted on a torque tube 30 forming a part of the rudder bar. In this case a bent tube 31 fixedly secured to the brake pedal, as by welding or any other similar process, transmits the pressure to the brake operating cable 32 to apply the brakes. The tube 31 is conveniently bent, as will be noted by referring to Figs. 5 and 6, so that the point of attachment of the brake cables will be as near the rudder bar pivoting axis as possible. This arrangement prevents any appreciable movement of the brake pedal when the rudder bar is rotated, but even a small eccentricity will not result in the application of the brakes when the rudder is operated if there is no resisting force on the upper bar of the brake pedal.

While this invention has been described more or less specifically with reference to the arrangements herein shown, it is again pointed out that the showing is illustrative and that the invention may be practised in many ways utilizing any form of power for application of the brakes and for controlling the effectiveness of such power in conjunction with rudder movement, all of such modifications or embodiments whereby the objects hereinbefore set forth may be attained falling within the spirit of this invention as defined by the appended claims.

What I therefore claim as new and desire to procure by Letters Patent is:

1. In a brake and rudder control mechanism for aircraft a rudder control member having a rudder pedal; a brake pedal pivotally connected at its lower end to said rudder pedal and having a tread portion relieved adjacent its pivotal end to provide against actuation of the brake pedal when actuating said rudder pedal.

2. In a brake and rudder control mechanism for aircraft a rudder control member having a rudder pedal; a brake pedal pivotally connected at its lower end to said rudder pedal, said brake pedal having a portion relieved adjacent its pivotal end and having its upper end disposed substantially in the plane of the rudder pedal so that a sliding movement of the foot from normal rudder operating position is required to operate said brake pedal.

3. In a brake and rudder control mechanism for aircraft a rudder control member having a rudder pedal; a brake pedal pivotally connected at one end to said rudder pedal, said brake pedal having its tread portion relieved adjacent its pivotal end and extending upward from said rudder pedal, the tread portion of said brake pedal being so disposed relative to said rudder pedal as to require a bodily movement of the operator's foot from normal rudder operating position to insure operation of said rudder pedal independently of said brake pedal.

4. In a brake and rudder control mechanism for aircraft comprising a rudder control member; a brake pedal pivotally connected at one end to said rudder control member, said brake pedal having a concave tread portion offset from its pivoted end whereby a bodily vertical movement of the foot from normal rudder operating position is required to actuate said brake pedal.

5. A brake pedal adapted to be pivotally connected to a rudder control mechanism, said brake pedal having a concaved tread portion whereby to permit independent actuation of said rudder control mechanism and said brake pedal.

6. A brake pedal adapted to be pivotally mounted at its lower end to a rudder pedal, said brake pedal having a tread portion relieved adjacent its pivotally mounted end to provide a clearance between the toe and the tread portion of said brake pedal when the operator's foot is in normal rudder operating position.

7. A brake pedal adapted to be pivotally mounted at its lower end to a rudder pedal, said brake pedal having its tread portion relieved adjacent its pivotally mounted end and adapted to be so constructed and arranged relative to said rudder pedal as to require a bodily movement of the foot from normal rudder operating position for operating said brake pedal.

8. A brake pedal adapted to be pivotally mounted at its lower end to a rudder pedal, said brake pedal having a tread portion relieved adjacent its pivotally mounted end and so constructed and arranged relative to said rudder bar to require a vertical translatory movement of the foot from the normal rudder operating position to actuate the brake pedal.

9. A brake pedal adapted to be pivotally mounted at one end to a rudder control mechanism, said brake pedal having a tread portion, the portion of the tread adjacent its pivotally mounted end being concave whereby when the foot is in normal operating position clearance between the toe and said offset tread portion is provided to prevent undesired operation of said brake pedal.

10. In a brake and rudder control mechanism for aircraft, a rudder control member having a rudder pedal provided with a tread, a brake pedal including a tread portion supported at its one end on said rudder pedal, the tread portion of said brake pedal being so disposed with respect to the tread portion of said rudder pedal such that said brake pedal may be operated independently of said rudder pedal.

In testimony whereof I affix my signature.
CLINTON W. HOWARD.